United States Patent [19]

Smith

[11] Patent Number: 4,836,522

[45] Date of Patent: Jun. 6, 1989

[54] SINGLE KNOB ADJUSTMENT APPARATUS

[76] Inventor: Thomas J. Smith, 1722 Asharoken Blvd., Bay Shore, N.Y. 11706

[21] Appl. No.: 123,919

[22] Filed: Nov. 23, 1987

[51] Int. Cl.⁴ .............................................. B23Q 3/00
[52] U.S. Cl. ........................................ 269/72; 269/77; 269/315
[58] Field of Search ............................ 269/45, 71-73, 269/77, 99, 315; 248/124, 229

[56] References Cited

U.S. PATENT DOCUMENTS

| | | | |
|---|---|---|---|
| 328,467 | 10/1885 | Crane | 269/71 |
| 4,030,718 | 6/1977 | Philipoff | 269/315 |
| 4,275,872 | 6/1981 | Mullis | 269/77 |
| 4,500,077 | 2/1985 | Coxon | 269/77 |

FOREIGN PATENT DOCUMENTS 710263  8/1931  France ..................... 269/71

Primary Examiner—Judy Hartman
Attorney, Agent, or Firm—Sachs & Sachs

[57] ABSTRACT

An adjustment apparatus which is capable of selectively securing to elongated members in a predetermined positional relationship includes a housing member having an eyebolt slidably positioned within a through aperture disposed longitudinally within a housing member; the eye portion of the eyebolt has a pivotal pin disposed therein affixing it to a T-bracket disposed proximate one end of the housing member. A sensing rod is disposed in a through aperture provided proximate the other end of the housing member which is permitted to flex. The eyebolt extending through the housing member is adapted to receive a threaded knob thereon and tightening the threaded knob simultaneously secures the housing member and sensing rod in a fixed position.

11 Claims, 3 Drawing Sheets

SINGLE KNOB ADJUSTMENT APPARATUS

BACKGROUND OF THE INVENTION

1. Field of the Invention

The present invention relates to a clamping apparatus for securing a sensing rod and body member in a preselected positional; relationship, and more particularly, relates to a single knob control for a mill stop.

2. Discussion of the Relevant Art

The art abounds with many types of apparatuses designed to position and hold a clamping device such as a gauge, pointer, or other device in a desired position or location. One typical device which attempts to accomplish this with a minimum number of control knobs is disclosed in U.S. Pat. No. 4,275,872 issued to Mullis on June 30, 1981. Although the device as disclosed therein has simplified construction, relative to other types of clamping devices or mill stops, there still is a requirement that more than one knob be rotated to get the apparatus to be affixed to the T-slot of a milling machine table, as well as, to set the desired position.

The instant invention overcomes this shortcoming by utilizing a single knob control to affix the apparatus to the milling machine table, as well as, adjust the position and location of the sensing rod and housing therefor.

Therefore, it is an object of the present invention to provide an apparatus for securing a housing and sensing member in a preselected positional relationship by utilizing a single knob for this function.

It is therefore another object of the present invention to provide an apparatus to readily permit the user thereof to affix the apparatus to a milling machine table and make the necessary adjustments utilizing a single knob to tighten and simultaneously clamp the apparatus to the milling machine table.

It is still yet another object of the present invention to provide a quickly setable mill stop apparatus which may be locked into position or readily released for the changing of positions with a single knob control.

It is a more specific object of the present invention, to provide an apparatus for locating successive work pieces on a milling machine, or the like, which may be readily attached to the mill table and adjusted to a desired configuration for engaging successive work pieces utilizing a single knob control.

It is still yet another object of the present invention to provide a simplified clamping apparatus utilizing a minimum of components and yet still provide a single knob for simultaneous adjustment in affixing the apparatus to a machine table.

SUMMARY OF THE INVENTION

A single knob adjustment apparatus for simultaneously securing and adjusting a pair of members in a predetermined positional relationship, according to the principles of the present invention, comprises an elongated housing member having a first centrally disposed through aperture along its longitudinal axis; a second through aperture is disposed proximate one distal edge perpendicular to the longitudinal axis. A slotted opening extends from one longitudinal edge through the second through aperture terminating proximate the opposite longitudinal edge. A slotted T-bracket has an elongated base portion disposed perpendicular to the housing longitudinal axis on one end and a pair of ear portions on the other end with third and fourth through apertures adapted to receive a pivot pin therein. An eyebolt is threaded on one end and is adapted to be slidably received within the first through aperture with the threaded portion thereof extending beyond the housing. The eye portion of the eyebolt has an opening adapted to receive a pivot pin therethrough and is adapted to be received between the pair of ear portions provided on the T-bracket means. A pivot pin is disposed within the third and fourth through apertures and the eye portion of the eyebolt. A coil spring circumscribes the eyebolt and is disposed between the ends of the T-bracket ear portions and the other distal edge of the housing member. A sensing rod is disposed within the second through aperture and a threaded knob which is adapted to receive the threaded end of the eyebolt so that when tightening the knob the apparatus is secured with the sensing rod in a fixed position.

The foregoing and objects and advantages will appear from the description to follow. In the description, reference is made to the accompanying drawing which forms a part hereof, and in which is shown by way of illustration, specific embodiments in which the invention may be practiced. These embodiments will be described in sufficient detail to enable those skilled in the art to practice the invention, and it is to be understood that other embodiments may be utilized and that the structural changes may be made without departing from the scope of the invention. The following detailed description is, therefore, not to be taken in a limiting sense, and the scope of the present invention is best defined by the appended claims.

BRIEF DESCRIPTION OF THE DRAWING

In order that the invention may be more fully understood, it will now be described, by way of example, with reference to the accompanying drawing in which.

DESCRIPTION OF THE PREFERRED EMBODIMENTS

Figure 1:
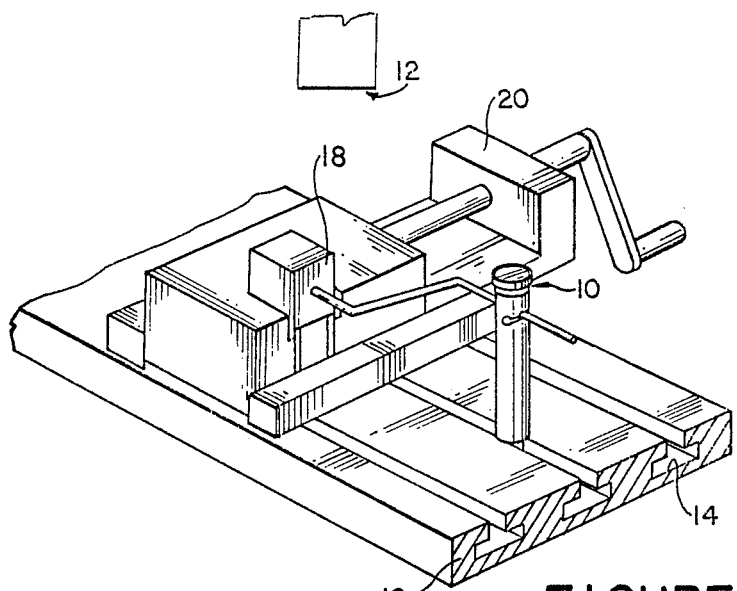
FIG. 1 is a fragmentary perspective view of the adjustment apparatus, according to the principles of the present invention affixed to a milling machine table.
Figure 2:
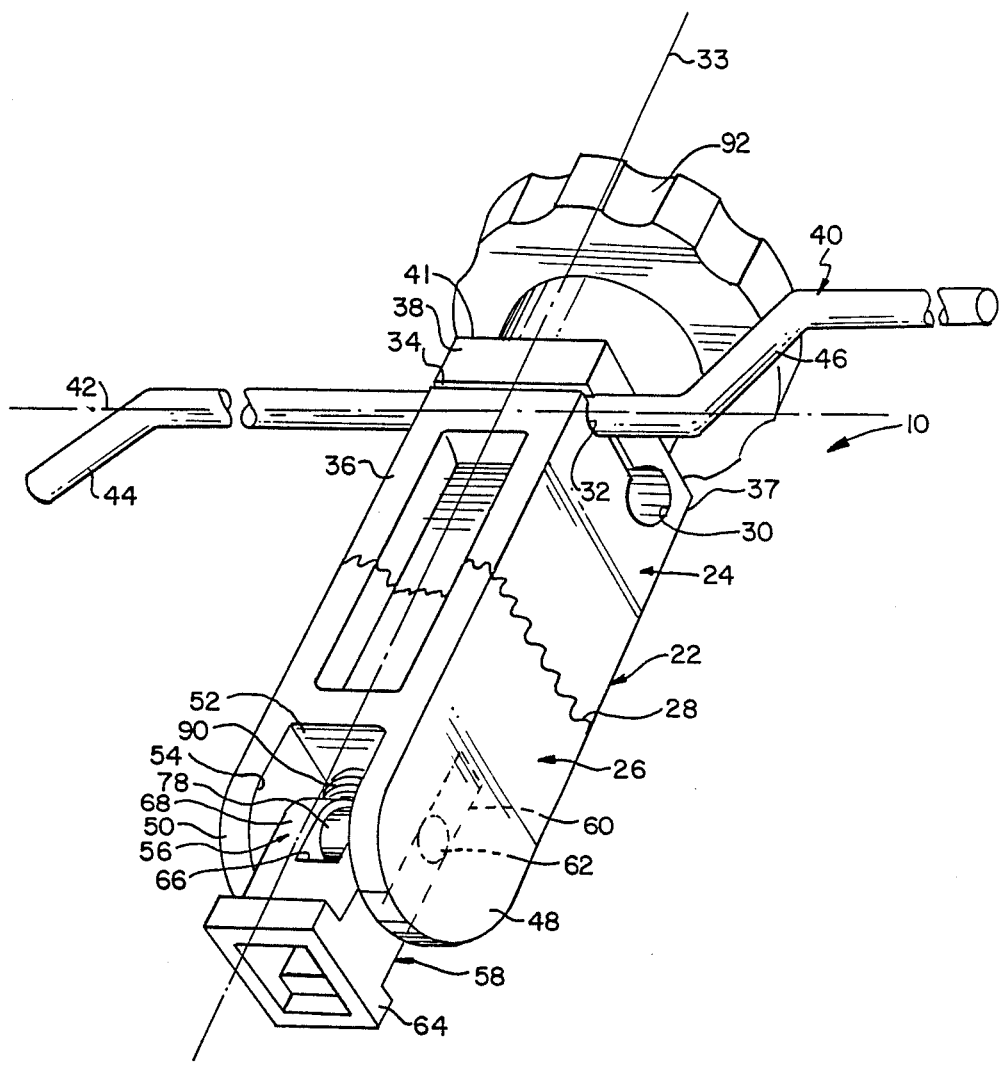
FIG. 2 is a perspective view of one embodiment of the adjustment apparatus fully assembled.

Referring to the drawing, and more specifically to FIG. 1, an apparatus 10, embodying the principles to the present invention, is illustrated for use as a work stop or locator on a milling machine 12. More particularly, the apparatus 10 is illustrated mounted in a T-slot 14 of the work table 16, of the milling machine 12. As will be apparent to those skilled in the art, the apparatus 10 is positioned so as to permit the machine operator to accurately and quickly locate successive work pieces 18 in the mounting vise 20. While in the illustrated embodiment the apparatus 10 is particularly designed for use with a milling machine, it will be understood that the novel features of the present invention are applicable to a variety of other uses where two elongated members such as a housing and sensing rod are releasably interconnected in a desired positional relationship. Referring now to FIG. 2 wherein the apparatus 10 is seen to include an elongated housing or body member 22, which may be fabricated of a single unitary piece or be fabricated in two pieces, which may include an upper portion 24 and a lower portion 26 the upper portion preferably being shorter than the lower portion. The cooperating surfaces 28 of the upper and lower portion may be serrated or notched so that when the surfaces of the upper and lower portion are rotated with respect to each other they may be more readily locked in position as will be explained hereinafter.

The upper portion 24 is provided with a through aperture 32 which is perpendicular to the housing member's longitudinal axis 33 and extends clear through the housing member. A second through aperture 30 also may be provided in the upper portion of the housing member, both apertures 30 and 32 are generally in line and connected by a slot 34 extending from one surface 36 of the upper portion through aperture 32 until it terminates proximate the opposite longitudinal surface 37 or until it reaches aperture 30, thereby providing a flexible or jaw portion 38 proximate the end 41 of the upper portion 24.

A sensing rod member 40 is adapted to slidably fit within aperture 32 and is bent at an angle from its longitudinal axis 42, which is transverse or perpendicular to the axis 33 of the housing member 22. The end portions 44 and 46 of rod member 40 are preferably bent a different angles from the longitudinal axis 42. The lower portion 26 is provided with a pair of extending ear portions 48 and 50 extending from the opposite end 52 of the serrated surface 28 providing a slot or channel 54 therebetween, which is adapted to receive the upwardly extending portion 56 of a slotted T-bracket 58, as will be described hereinafter. The ear portions 48 and 50 may be provided with a slot 60 adapted to slidably receive a pivot pin 62 which may slidably move within the slot 60 parallel to the longitudinal axis 33, the function of which will be explained hereinafter. The ear portions 48 and 50 permit the housing 22 to tilt relative to the surface of the work table 16.

The slotted T-bracket member 58 includes an elongated base portion 64 which is disposed perpendicular to the housing longitudinal axis 33 and includes the upwardly extended or vertical portion 56 into which is cut a slot or channel 66, thereby creating a pair of ear portions 68 and 70 which are provided with through apertures 72 and 74 (see FIG. 3) which are adapted to receive pivot pin 62 therein.

Extending the complete length of the housing or body member 22 is a through aperture 76 which is generally centrally disposed along the longitudinal axis 33 and is included in all of the embodiments disclosed herein. This through aperture 76 is adapted to slidably receive an eyebolt 78 therein. The eyebolt 78 has a threaded portion 80 at one end and an eye portion 82 at the other end. The eye portion 82 includes an opening 84 therein that is adapted to receive pivot pin 62 which functions as a rotational axis for the eyebolt 78.

Figure 3:
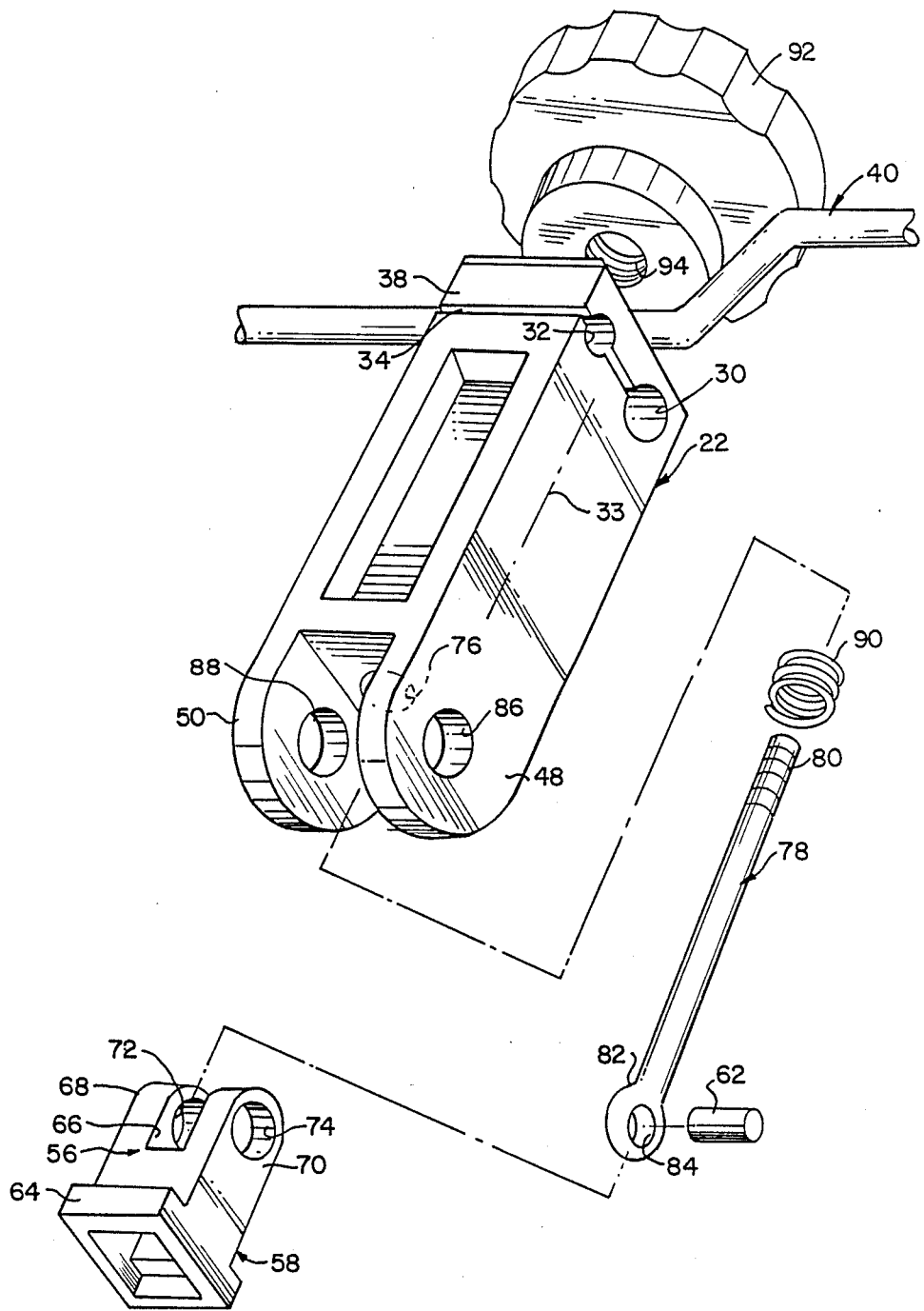
FIG. 3 is a perspective exploded view of the embodiment shown in FIG. 2 including an alternative embodiment of the ear portion of the housing.

Referring now to FIG. 3, which is an exploded view of the embodiment shown in FIG. 2, one may readily discern how the apparatus 10 is assembled. In the embodiment shown in FIG. 3 the housing and body member 22 is shown as a unitary piece whereas the body portion 22 in FIG. 2 is shown to have an upper portion 24 and a lower portion 26, however, the assembly of the apparatus 10 is the same whether the body portion is made in one or two pieces. The ear portions 48 and 50 shown in FIG. 3 include an elongated hole 86 and 88 disposed therein which is another way of providing movement along the longitudinal axis 33 for the pivot pin 62, as will be explained hereinafter. In all of the embodiments, except that disclosed in FIG. 4, the pivot pin must be placed within the opening 84 and retained within the apertures 72 and 74 of the ear portions 68 and 70 of a slotted T-bracket 58. In one embodiment the pivot pin may be chosen to slide freely between the ear portions 48 and 50 of the body member 22, as shown in FIG. 2. The lower portion 26 the eyebolt 78 has a coil spring 90 placed thereover and then the threaded portion 80 is inserted into aperture 76 wherein the threaded portion extends beyond the end 41 of housing member 22 and is adapted to receive a knob 92 thereon, which is provided with a centrally disposed threaded portion 94 adapted to cooperate and receive the threaded portion 80 of the eyebolt 78. Alternatively, a conventional toggle lever and/or pin (not shown) may be utilized in place of knob 92.

Figure 4:
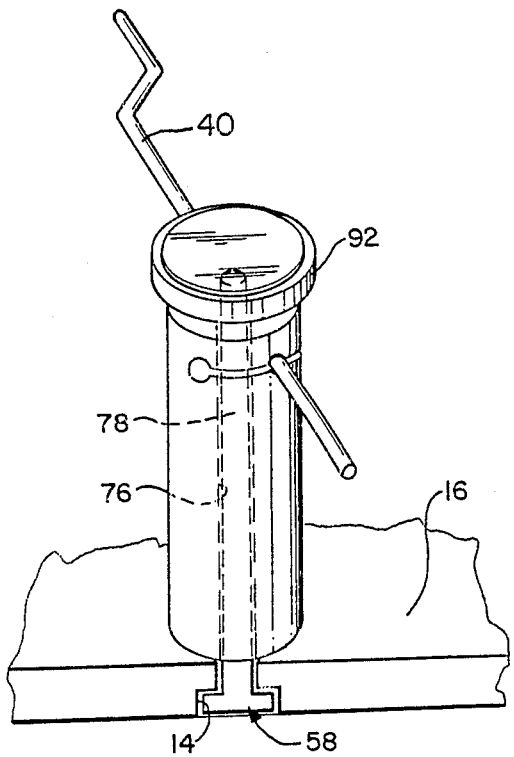
FIG. 4 is a perspective view similar to FIG. 2 showing an alternative embodiment of the single knob adjustment apparatus.

In the embodiment shown in FIG. 4 the housing or body member 22 is cylindrical in shape rather than rectangularly-shaped as in FIGS. 2 and 3. However, it is assembled in exactly the same manner. It is also to be noted that the ear portions are not provided on the housing member 22 and thus, it is free to rotate on the surface or work table 16 of a milling machine 12. Also, it is to be noted that in the embodiment disclosed in FIG. 4 the T-bracket member 58, the eyebolt 78 and the pivot pin 62 may be fabricated as a single unitary member. Hereagain, the edge of the body member 22 resting upon the surface 16 of milling machine 12 may be provided with a serrated edge in order to insure the locking of the apparatus once it is tightened. The T-bracket member 58 is identical to that shown in the embodiments of FIGS. 2 and 3 and the body member 22 although shown in one piece may further be divided into two pieces, an upper and lower portion, with a serrated edge therebetween as shown in FIG. 2, if desired.

In operation, the horizontally disposed base portion 64 of the T-bracket 58 is adapted to cooperate with and be inserted in T-slot 14 provided the milling machine 12 and thus, the lower surface or body member 22 will come into contact with the work table surface 16 of the milling machine 12 by tightening the knob 92 it will draw the eyebolt 78 in upward position thus the base portion 64 of the T-bracket will engage the T-slot 14 and hold it in position. Simultaneously the slot 34 will compress and the flexible or jaw portion 38 will clamp the sensing rod 40 within aperture 32 locking it in position. Sensing rod 40 and body 22 may be rotated or tilted (depending upon the configuration of body member 22) to determine the sensing or stop point for the work piece that is to be inserted into the vise 20 affixed to the milling machine work table 16. Thus, by tightening the single knob or toggle lever 92 the sensing point may be set up and fixed in position. With a simple rotation of the knob 92 to its unlocking position the adjustment may be changed to any position desired.

Hereinbefore has been disclosed a simple single knob adjustment apparatus ideally suited for use as a mill stop. It will be understood that various changes in the details, materials, and arrangements of parts and operating conditions which have been herein described and illustrated in order to explain the nature of the invention may be made by those skilled in the art within the principles and scope of the instant invention.

Having thus set forth the nature of the invention, what is claimed is:

1. A single knob adjustment apparatus for simultaneously securing and adjusting a pair of members in a predetermined positional relationship comprising:
   (a) an elongated housing member having
      (i) a first centrally disposed through aperture along its longitudinal axis,
      (ii) a second through aperture disposed proximate an upper position of said housing perpendicular to said longitudinal axis, and
      (iii) a slotted opening extending from a longitudinal edge through said second through aperture terminating proximate the opposite longitudinal edge, and
   (b) slotted T-bracket means having;
      (i) an elongated base portion disposed perpendicular to said housing longitudinal axis,
      (ii) first and second ear portions on said base portion having third and fourth through apertures respectively, said third and fourth through apertures adapted to receive a pivot pin therein;
   (c) eyebolt means, said eyebolt means;
      (i) having an elongated portion on one end,
      (ii) adapted to be slidably received within said first through aperture with said one end of the elongated portion extending beyond said housing, and
      (iii) being provided with an eye portion on the other end, said eye portion having an opening adapted to receive a pivot pin therethrough and dimensional to be received between said pair of ear portions of said T-bracket means;
   (d) pivot pin means disposed within said third and fourth through apertures and the eye portion of said eyebolt with ends of said pivot pin means retained in a lower portion of said housing member;
   (e) coil spring means circumscribing said eyebolt means and disposed between a top portion of said T-bracket means ear portions and said lower portion of said member;
   (f) sensing rod means disposed within said second through aperture; and
   (g) means for receiving the elongated portion of said eyebolt means, whereby tightening said means for receiving secures said eyebolt means said sensing rod means and said housing member in a fixed position.

2. The apparatus according to claim 1 wherein said elongated base portion of said T-bracket means is adapted to be received into and cooperate with a T-slot provided on a milling machine table, said apparatus being removably affixed to said milling machine table by tightening said means for receiving.

3. The apparatus according to claim 1 wherein said housing member is divided into an upper portion and said lower portion; said upper portion being adjustable with respect to said lower portion.

4. The apparatus according to claim 3 wherein mating surfaces between said housing member upper portion and said housing member lower portion are serrated to provide a locking means when said means for receiving is tightened.

5. The apparatus according to claim 1 wherein at least one end of said rod means is bent at an angle from the longitudinal axis of said rod means.

6. The apparatus according to claim 1 wherein said housing member is provided with a pair of extending ear portions disposed on said lower portion, said housing member ear portions being provided with fifth and sixth elongated through apertures perpendicular to said longitudinal axis adapted to slidably receive said pivot pin therein for movement parallel to said longitudinal axis.

7. The apparatus according to claim 1 wherein said housing member is provided with a pair of extending ear portions disposed on said lower portion, said extending ear portions including opposed channels to permit said pivot pin to slidably move within said lower portion in a direction parallel to said longitudinal axis.

8. The apparatus according to claim 6 wherein said fifth and sixth apertures and said pivot pin means provide retaining means for preventing said slotted T-bracket means from separating from said housing member when said receiving means is disengaged from said eyebolt means threaded end.

9. The apparatus according to claim 1 wherein the eyebolt means, pivot pin means and the slotted T-bracket means are a single unitary member.

10. The apparatus according to claim 1 wherein said slotted opening is provided with an additional through aperture at the termination of said slotted opening.

11. The apparatus according to claim 1 wherein said eyebolt means elongated portion is threaded on said one end, and said means for receiving said one of said eyebolt means is a threaded knob.

* * * * *